US008056498B2

(12) United States Patent
Holt et al.

(10) Patent No.: US 8,056,498 B2
(45) Date of Patent: Nov. 15, 2011

(54) INSPECTION AND TESTING INDICATOR

(75) Inventors: Robert Holt, Cornwall, NY (US); David J. Haas, Suffern, NY (US)

(73) Assignee: Brady Worldwide, Inc., Milwaukee, WI (US)

( * ) Notice: Subject to any disclaimer, the term of this patent is extended or adjusted under 35 U.S.C. 154(b) by 0 days.

(21) Appl. No.: 13/012,954

(22) Filed: Jan. 25, 2011

(65) Prior Publication Data

US 2011/0129394 A1 Jun. 2, 2011

Related U.S. Application Data

(62) Division of application No. 10/674,882, filed on Sep. 30, 2003, now Pat. No. 7,898,907.

(60) Provisional application No. 60/414,880, filed on Oct. 1, 2002.

(51) Int. Cl.
*G01N 1/28* (2006.01)

(52) U.S. Cl. ........................................ 116/206; 368/327

(58) Field of Classification Search .......... 116/206-207, 116/216; 374/156, 162; 368/327
See application file for complete search history.

(56) References Cited

U.S. PATENT DOCUMENTS 3,065,083 A 11/1962 Gessler
3,520,124 A * 7/1970 Myers ............................. 368/92
3,726,645 A * 4/1973 Kaczmarek ................... 422/407
3,914,174 A * 10/1975 Fuchs ........................... 210/658
4,057,029 A 11/1977 Seiter
4,065,263 A * 12/1977 Woodbridge, III ........... 422/427
4,292,926 A 10/1981 Tilman
4,420,353 A * 12/1983 Levine .......................... 156/227
4,428,908 A * 1/1984 Ashley et al. ................. 422/430
4,752,448 A * 6/1988 Wells et al. ................... 422/420
4,788,039 A 11/1988 Glattstein
4,962,043 A * 10/1990 Nagase et al. ................ 436/165
5,045,283 A 9/1991 Patel
5,053,339 A 10/1991 Patel
5,296,380 A 3/1994 Margalit
5,364,132 A 11/1994 Haas et al.
5,446,705 A 8/1995 Haas et al.
5,457,054 A * 10/1995 Geisinger et al. ............... 436/92
5,602,804 A 2/1997 Haas
5,629,164 A * 5/1997 Rivers ............................ 435/7.9
5,635,403 A * 6/1997 Bailey ............................. 436/66
5,648,047 A 7/1997 Kardish et al.

(Continued)

FOREIGN PATENT DOCUMENTS

WO 03077227 9/2003

*Primary Examiner* — R. A. Smith
*Assistant Examiner* — Tania Courson
(74) *Attorney, Agent, or Firm* — Quarles & Brady LLP

(57) ABSTRACT

An indicator is disclosed that detects the presence of a chemical residue. The indicator includes a substrate having an upper surface and a lower surface and a first portion and a second portion joined at a fold line. The first portion is smaller in area than the second portion. An adhesive coats the upper surface of at least the second portion of the substrate. A first reactant is adhered to the upper surface of the first portion of the substrate. When the second portion is contacted with a surface containing the chemical residue, the residue adheres to the adhesive and when the first portion is subsequently folded along the fold line so that the upper surfaces of the substrate contact each other, a portion of the adhesive on the second portion remains exposed and the first reactant and chemical residue react to provide the color indicia indicating the presence of the chemical residue.

16 Claims, 8 Drawing Sheets

U.S. PATENT DOCUMENTS

| | | | | |
|---|---|---|---|---|
| 5,715,215 | A | 2/1998 | Haas et al. | |
| 5,719,828 | A | 2/1998 | Haas et al. | |
| 5,785,354 | A | 7/1998 | Haas | |
| 5,822,280 | A | 10/1998 | Haas | |
| 5,873,606 | A | 2/1999 | Haas et al. | |
| 5,890,743 | A | 4/1999 | Garrison et al. | |
| 5,930,206 | A | 7/1999 | Haas et al. | |
| 5,947,369 | A | 9/1999 | Frommer et al. | |
| 5,957,458 | A | 9/1999 | Haas et al. | |
| 6,426,230 | B1 * | 7/2002 | Feistel | 436/165 |
| 6,544,925 | B1 | 4/2003 | Prusik et al. | |
| 6,752,430 | B2 * | 6/2004 | Holt et al. | 283/72 |
| 6,796,065 | B2 | 9/2004 | Haas | |
| 7,294,379 | B2 | 11/2007 | Ko et al. | |
| 7,372,780 | B1 | 5/2008 | Braunberger | |
| 7,742,367 | B2 * | 6/2010 | Haas | 368/327 |
| 7,817,498 | B1 * | 10/2010 | Hinckley | 368/10 |
| 2004/0013839 | A1 | 1/2004 | Ko et al. | |
| 2008/0044310 | A1 * | 2/2008 | Haas | 422/58 |

* cited by examiner

INSPECTION AND TESTING INDICATOR

CROSS-REFERENCE TO RELATED APPLICATIONS

This application is a divisional patent application of U.S. patent application Ser. No. 10/674,882 filed on Sep. 30, 2003, now U.S. Pat. No. 7,898,907 which claims the benefit of U.S. provisional patent application Ser. No. 60/414,880 filed on Oct. 1, 2002, which are hereby incorporated by reference as if set forth in their entirety herein.

BACKGROUND OF THE INVENTION

It is a common practice for security personnel to inspect and test packages, purses, etc. for dangerous, illegal or hazardous items prior to persons entering secure areas, e.g., airports, public events, etc. It is also common for security personnel to inspect and test vehicles (automobiles) for hazardous materials.

This invention relates to simple, disposable stickers used by security personnel guarding a secure area, facility, or transportation vehicle to indicate that a person, package, or vehicle entering such secure areas has been inspected and is permitted to be therein.

Also, these simple, disposable stickers may be fabricated so as to perform trace analysis on the inspected article.

More specifically, this invention relates to a self-expiring inspection sticker that provides a positive, visible indication that the article or vehicle to which it is affixed has been inspected for weapons, contraband, etc.

This invention also relates to this type of adhesive sticker construction being used as a testing device, to test for explosives, narcotics, and other contraband items. These adhesive stickers may even be used to seal the article for a short period of time after inspection.

RELATED ART

Based on the specific location of a search, inspected articles, typically hand-carried articles, do not necessarily need to be tagged after input because the articles may be entering directly into a secure facility. However, in many facilities an inspection may be performed at one location in an insecure facility and the person must show that the article was inspected elsewhere in a secured facility. This requires an inspection sticker of some type for the inspected article. Also, these inspections of the people, packages, or vehicles may occur outside a facility, in a street or field where sophisticated equipment is not practical. Often it is desirable to secure the inspected article until some future time after inspection and this requires some type of sealing or wrapping band to go around the article.

In cases where a visual indicating device is used to show that the article was inspected, it is important that the inspection indicating device not be able to be used again. Traditionally, inspection devices, like visitor badges, solved such reuse problem by issuing the devices-in a different color or serial numbers for each day. This required, for example, seven colors, one for each day of a week, or thirty-one colors, one for each day of the month.

In general, this solution to the reuse problem is unsatisfactory for a number of reasons: 1) the guards must be able to identify the particular color for that day, 2) inventory must be kept of the various colors to prevent running out of a particular color, particularly because the number of devices used of each color can differ widely, 3) people can keep the different colors of the inspection devices and simply use the proper color anticipated for another day, and 4) the numbers or colors must be large enough to be easily seen from a distance.

More specifically, this invention solves the problem of identifying and verifying that a piece of carry-on luggage or a parcel has been inspected. In addition to tamper-indicating features, a visible self-expiration feature replaces the functionally of color coding, sequential numbering or date stamping, as well as preventing removal and reuse and eliminates the need for hardware or electronic systems.

SUMMARY OF THE INVENTION

In one embodiment, a time indicator is provided that provides a color indicia after a predetermined period of time has passed after activation. The time indicator includes a substrate, preferably a clear or transparent substrate, having an upper surface and a lower surface and a first portion and a second portion joined at a fold line. The first portion is of a smaller area than the second portion. An adhesive coats the upper surface of at least the second portion of the substrate. A first reactant is adhered to the upper surface of the first portion of the substrate and a second reactant is adhered to the upper surface of the second portion of the substrate. When the first portion is folded along the fold line so that the upper surfaces of the substrate contact each other, a portion of the adhesive on the second portion remains exposed. This exposed area may be used to attach the indicator to an article or documents. When so folded the first reactant and second reactant contact each other to activate the indicator and to provide the color indicia after the predetermined period of time after activation passes.

In another embodiment of the invention, the indicator is used to detect the presence of a chemical residue, e.g., explosive compound residues. The indicator comprises a substrate, preferably transparent, having an upper surface and a lower surface and a first portion and a second portion joined at a fold line, the first portion being smaller in area than the second portion. An adhesive coats the upper surface of at least the second portion of the substrate. A first reactant is adhered to the upper surface of the first portion of the substrate. When the second portion is contacted with a surface containing the chemical residue, e.g., the handle of a briefcase, the residue adheres to the adhesive. When the first portion is subsequently folded along the fold line so that the upper surfaces of the substrate contact each other, a portion of the adhesive on the second portion remains exposed. This exposed portion may be used to attach the indicator to an article, e.g., passport. The first reactant and chemical residue react with each other to provide the color indicia indicating the presence of the chemical residue.

DETAILED DESCRIPTION OF THE INVENTION

Figure 1:
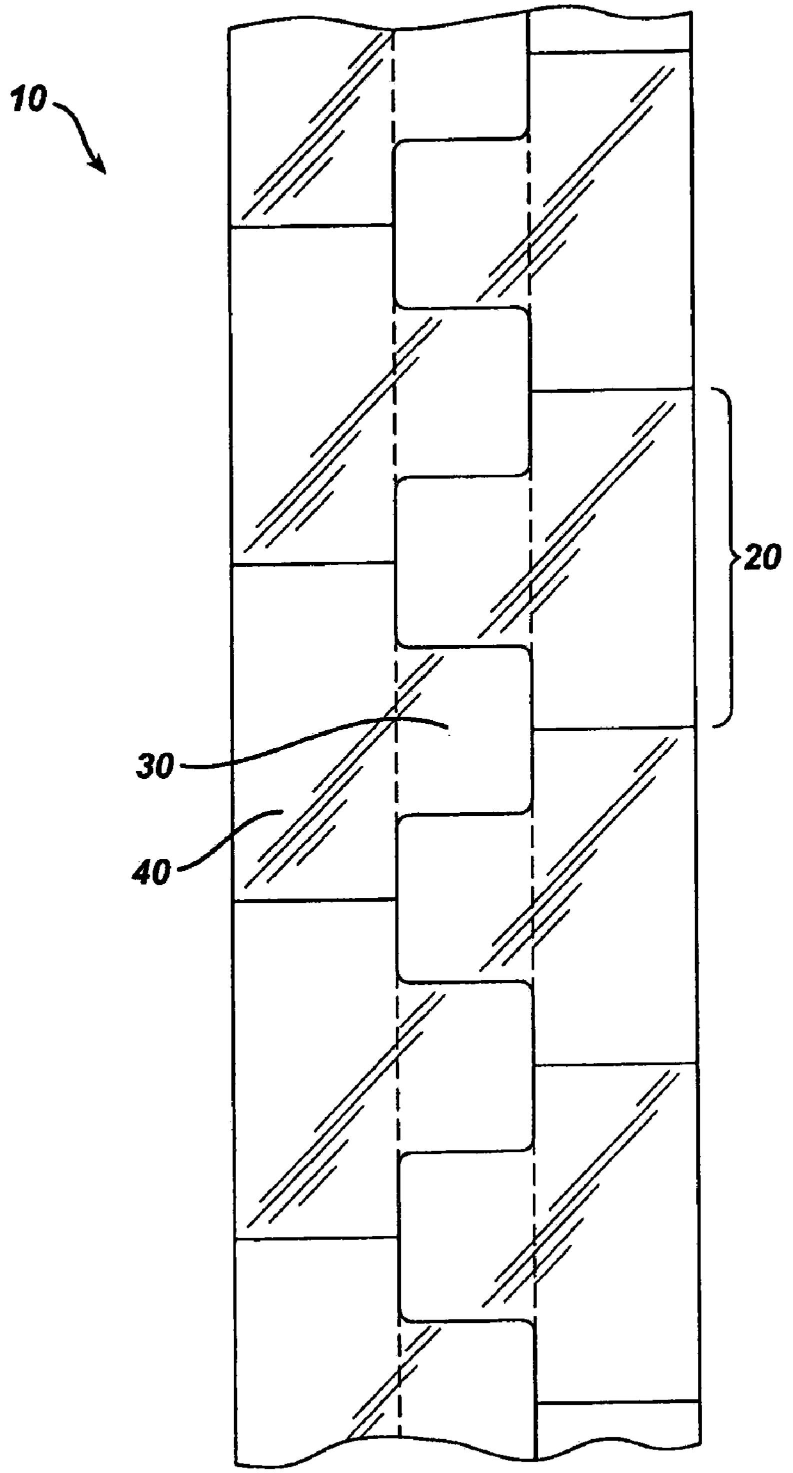
FIG. 1 shows a plan view of a plurality of inspection tags in sheet form.

We will use the term inspection tags to mean pressure sensitive paper sticker products that are attached to articles to specifically indicate that the article has been inspected by an inspection person. The inventions described herein cover two functional types of one-piece inspection tags: a) inspection stickers to show that the article has been inspected, and b) testing stickers to show that the article does or does not contain a target substance such as explosives.

It is important that these stickers be one-piece because the human factors involved with the person performing the inspection are extremely important for the successful use of such a device. These inspection and testing stickers do not require any auxiliary hardware, power source, or batteries. A security person cannot be expected to assemble two or more components properly while standing in a field or on a roadway, and the person may not have a table or work surface for such assembly. It is the one-piece, self-alignment, and color-changing construction of these inspection stickers that make the invention useful.

These unique adhesive stickers are constructed with the following properties:

One-piece pressure sensitive adhesive stickers that contain two chemically-independent reactive surfaces.

Pressure sensitive adhesive stickers where the two chemically-independent reactive surfaces are covered and protected from exposure to the environment and foreign matter before use.

Pressure sensitive adhesive stickers with a clear viewing window to observe any color change on either of the two reactive surfaces.

Pressure sensitive adhesive stickers where the two reactive surfaces can be brought into accurate alignment and contact with each other with the person employing only one hand.

Stickers constructed such that once the activation for timing or testing has been initiated, the sticker can be affixed to an the article or person inspected.

These labels are intended for use without other equipment or hardware. They are intended to be used by people in field operations (typically standing at remote locations) as well as at desk and inside facilities like airport concourses. What is more important, they are intended to be used by people who do not always have both hands available because of other tasks that they are performing. In an extreme case such as military situations, this may be while solders are holding their weapon with one hand. Thus, the simplicity of the operational process is an important factor in the invention of this sticker.

An inspection can be for any of a variety of purposes; custom regulated items, security items, contraband items, or excluded items like liquor, etc. Even though the inspection tags of this invention can be used in certain situations to seal the inspected article, this is not its primary purpose. The inspection stickers are intended to be attached to an inspected article or document. After a period of time, such as one day, the inspection sticker will change color or show words like 'VOID' to prevent the stickers from being usable in the future.

The testing stickers are intended to be used to sample the article for traces of specific substance such as explosives, narcotics, etc. Upon activating the sticker, a color change will occur if traces of the substance are detected. The chemical technologies employed in these color-changing time-stickers and the color-changing testing stickers are well known.

Referring to commonly used self-expiring security badges employing the Visually Change Paper technology, each VCP security badge consists of two separate parts, a pressure sensitive adhesive display front part and a migrating ink back part. When the adhesive front part is adhesive attached to the back part, the adhesive dissolves the migrating ink, the ink diffuses into the front part, and the front part changes color.

The present invention is a new construction which performs the same function as these two part badges, except it is a single unit construction. An inspected article means the object being inspected, such as a briefcase, a purse, and/or package. For definition purposes, these inspection stickers contain an indicator area on the inspection sticker or device that indicates a valid or void state of the inspection. Generally, this is an area on the device that is printed with a migrating ink or other chemical agents.

The time dependant color-changing process or function employed in all of the embodiments described herein is a well-known technology. In particular, the technology and products are described and claimed, for example, in the following U.S. Patents: U.S. Pat. Nos. 5,364,132; 5,446,705; 5,602,804; 5,715,215; 5,873,606; 5,719,828; 5,785,354; 5,822,280; 5,930,206; and 5,957,458. The entire disclosures of these patents are incorporated herein by reference.

The products described and claimed in these patents have become universally accepted as the means for controlling and improving visitor security and temporary badges. These products are generally self-expiring visitor badges, which simply change color, and show an expired indicia after the predetermined authorization time has lapsed. The inspection sticker or inspection device of this invention is designed to have specific properties in order to be functional for the officers and security officials using them. They must be 1) easy to use, 2) tamper indicating, 3) ensure a useful life intended for the inspected duration, and 4) be low cost.

The self-expiring inspection tags of this invention eliminate the reuse problem associated with prior known devices because they change color after a predetermined time interval to prevent reuse of the devices. Because the device is permanently rendered void, its reuse is impossible. Further, because it cannot be used the next day, only one color of the product is required so that the inventory control of this single item is much simpler and more cost effective than non expiring devices. The self-expiring inspection indicator of this invention is secure, meaning that it cannot be removed from an article and reapplied to another article. Additionally, the indicator cannot be left on an article and used at another time. Additionally, the indicator may be made so that it is tamper indicting, i.e., an attempt to remove the indicator is obvious to one observing the indicator after it has been tampered with. Surfaces covered with pressure sensitive adhesives can be made tamper indicating and resistant to removal by a variety of conventional means.

The self-expiring inspection sticker is comprised of two separate components which we will call the adhesive part and display part. The display part has a migrating ink printed thereon and the adhesive part has an exposed adhesive surface. Whereas the two components are co-planar, they are laterally displaced and not in contact with each other. When used, the adhesive part is folded over so as to be exactly be positioned parallel to the display part, and it is then pressed onto the display surface to make intimate contact with the migrating ink. This is typically done with the fingers. This initiates the timed color-changing process by placing the migrating dye in contact with the diffusing adhesive material.

With the substrate of the sticker being a clear plastic material like 0.001" or 0.002" polyester, people can view the indicating surface through the exposed side of the sticker. With the remaining exposed adhesive surfaces, the sticker can be attached to the article that was just inspected, or it could be attached to some document of the owner of the article. After a period of time the adhesive contact with the migrating ink causes the display part to change color or show VOID words.

These constructions of the self-expiring inspection sticker of this invention are a one-part construction and performs the same functions as the two part construction. However, the inspection stickers (tags) of this invention can be of any size or shape. Broadly, a one-piece sticker has a first portion of the top surface covered with an adhesive and a second portion of the top surface covered with migrating ink. When the migrating ink portion of the sticker is folded over to contact the portion of the top surface covered with adhesive, the time function is activated. Subsequent thereto the remaining uncovered adhesive portion is used to attach the sticker to the inspected article. After the predetermined period of time the migrating ink bleeds to indicate expiration. Many variations of adhesive/migrating ink configurations may be used as long as the self-expiring inspection sticker is one piece with a foldable portion that activates the time function.

In another embodiment, the sticker is used for the detection of a contaminant substance, for example, explosives, drugs, poisons, etc. Such a sticker is, in effect, being used as a testing device. The inspector removes the sticker from its protective liner (typically silicone coated paper) and samples the suspect article by touching the adhesive portion (the adhesive part) to the surface of the article. This can be done repeatedly and the inspectors fingers can be used to press from the rear the adhesive surface of the sticker onto the sampling surface. These stickers are typically about 2" or 3" long in order to have enough surface area for the fingers to apply pressure. In trace explosives detection, some of the surface absorption and top surface contamination will remain attached to the adhesive of the sticker. The adhesive of these stickers will typically have organics captured in the adhesive itself, so this will assist with the transfer of the substances to the adhesive surface.

This single sticker is also comprised of two separate components, adhesive part and display part. The display part has one or more chemical agents printed thereon and the adhesive part has an exposed adhesive surface. Whereas the two components are co-planar, they are laterally displaced and not in contact with each other. When used, the display part component is folded over so as to be exactly positioned parallel to the adhesive part component, and it is then pressed onto the back part adhesive surface. This is typically done with the fingers. This initiates the chemical reaction process by placing the chemical agents in contact with the adhesive material which contains the trace explosive (substance) material.

With the substrate of the sticker being a clear plastic material like 0.001" or 0.002" polyester, people can view the indicating surface through the exposed side of the sticker. The chemical reaction and color change may occur in a matter of seconds, so the inspector can determine very quickly if the article has been exposed to explosive materials or contamination. With the remaining exposed adhesive surfaces, the sticker can be attached to the article that was just inspected, or it could be attached to some document of the owner of the article.

Whereas the configuration of the testing sticker can be a variety of forms such as those shown as the T-tag configuration, the rectangular configuration, and others, each configuration possesses the four specific functional components required in the testing function. These four functional components are the adhesive sampling surface, the color-forming reactant surface, the fold-over activation (and alignment) property, and the clear viewing window property.

Depending on whichever configuration is used, the sticker can provide the very important (additional) property of attaching the testing sticker to the article or to documents associated with the article. Since the testing sticker will provide verification results of the security or analytical test, it is important to be able to associate the specific testing sticker with a particular article. Many color forming reactants have been published in the patent literature. For our description here, we shall just list a sample of those specific for explosives trace detection. These reactants can be applied as discrete circles or squares on the testing sticker reactant surface or as discrete bands along the testing sticker reactant surface. Bands of reactant are preferred along the testing surface because bands of chemicals can be applied continuously from solution during the production process. From the functional point of view, bands will provide a larger area for detecting explosives on the adhesive samples surface. A sample explosive that does not cover the entire sampling surface could very well miss a circle of reactant when the adhesive sampling surface if folded over on the reactant surface.

An example of a detection system that could be used in this invention is described in U.S. Pat. No. 5,296,380 to Margalit, the entire disclosure of which is incorporated herein by reference. Thus, for example, to detect nitroaromatic explosives, the first reagent band could be an alkaline resin containing an diazotizable amino aromatic azo-dye precursor; for detecting organic nitrates and nitramines, the second reagent could be an acidic resin containing nitrate to nitrite ion reducing agent and a diazo-coupler; for detecting inorganic nitrates, the third resin could be a resin containing zinc powder; for detecting chorates and bromates, the fourth reagent could be an acidic resin with inorganic nitrates and an aniline salt. Margalit states that these four color detection reagents provide an excellent system for examining the sample of explosives for detection.

Another example of a detection system that could be used in this invention is described in U.S. Pat. No. 4,788,039 to Glattstein, the entire disclosure of which is incorporated herein by reference. Thus, for example, the adhesive sampling layer can include a solvent such as dimethylsulfoxide and a coating of tetra-alkyl ammonium or phosphonium hydroxide on the reactant surface. Glattstein states that this change accelerates the elimination reaction of nitrate esters, producing the preferred nitrate ions which can be readily detected by a second reagent that produces the well-known Griess reaction to produce a colored azo dye. This dye color change can be viewed on the reaction surface through the clear support film which acts as the viewing window. Glattstein also states that nitroamines undergo alkaline cleavage to form nitrite ions, which produce the same colored azo compound by the Griess reaction. Likewise, polynigroaromatics form lightly colored (violet-dark) compounds upon reaction with this reaction. Thus, this provides a multi-reagent test kit for the presumptive identification of traces of explosives.

The shape and construction of the inspection tags are shown in the FIGS. 1-14.

FIG. 1 shows the preferred construction of the indicator or tag 20. The components of the tag 20 are shown in schematic in FIG. 2.

Figure 2:
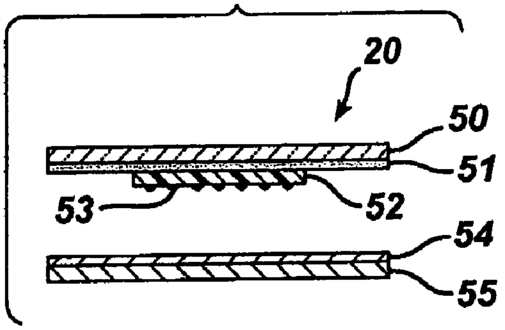
FIG. 2 shows an exploded cross section taken through one of the tags of FIG. 1.

Referring to FIGS. 1 and 2, the indicator 20 comprises a clear substrate 50 which forms the facestock for the web assembly 10. Substrate 50 may, for example be polyester film with thickness of 1 to 10 mils. The substrate 50 is clear so that the color change caused by reactant 53 can be viewed. Printing may be applied to the front of the substrate 50. Such printing could be instructions such as fold-over or fold-here. Other printing could provide identification to the user of the inspection tag and would add security to prevent counterfeiting or substituting another sticker in its place.

Figure 3:
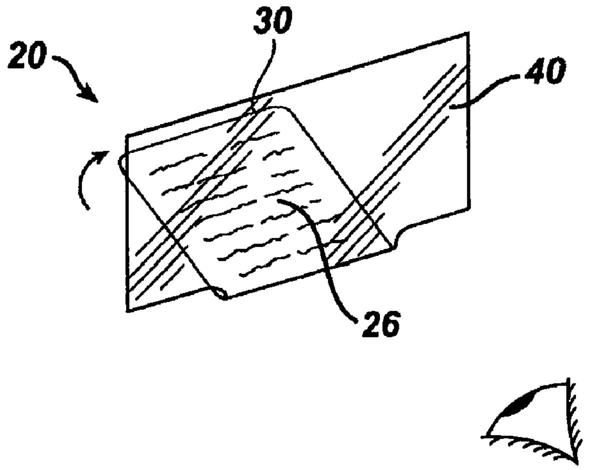
FIG. 3 shows a perspective view of a portion of an inspection tag of FIG. 1 partially folded onto itself along a fold line.

Referring to FIGS. 1 and 3, web 10 could be die-cut into a plurality of indicators 20. The indicators could be of any shape that is convenient to the user, e.g., rectangular, round, or the preferred T shape as shown in the Figures herein. The T shape permits the reactant display surface 30 to be easily folded over onto the adhesive sampling surface 40. By this construction, the display surface 26, 30 sticks to the central adhesive portion of the adhesive sampling surface 40 of the T shaped indicator 20, while leaving both ends of adhesive sampling surface 40 exposed for attaching the indicator 20 to the inspected article or the documents associated therewith.

Referring to FIG. 2, on the underside of the clear substrate 50 is a clear adhesive 51 which may have various organics mixed within the adhesive to form the solvent for the color forming reactions. The adhesive coating 51 covers the entire surface of substrate 50 and is protected from the environment by the silicone coating 54 on the release paper 55. This is a well known means of construction for pressure sensitive film materials. Printing, such as instructions, can be applied to the rear surface of the release liner 55.

Referring to FIG. 2, attached to the adhesive layer 51 and sandwiched between the facestock 50 and the release liner 55 is the display surface 52 with the color forming reactants on the surface in contact with the silicone liner 54. The color forming chemicals or reactants can be printed as a uniform coating 53 on the display surface 52 or they can be applied in patterns or bands. In any case, the display surface 52 is normally non-porous so as not to absorb or permit any of the organic liquids in the adhesive 51 on the clear substrate 50 to penetrate therethrough.

In one embodiment, when using the indicator 20 to test for reactants, one lifts the die-cut sticker 20 off the release liner 54, 55, contacts the adhesive 51 and reactant 53 several times to a surface to be tested, e.g., luggage handle, to get a sample of any residue. Referring to FIG. 3, the display surface or flap 26 is then folded onto the opposing adhesive 40 to initiate the reaction and color change process. (See FIG. 4)

Figure 4:
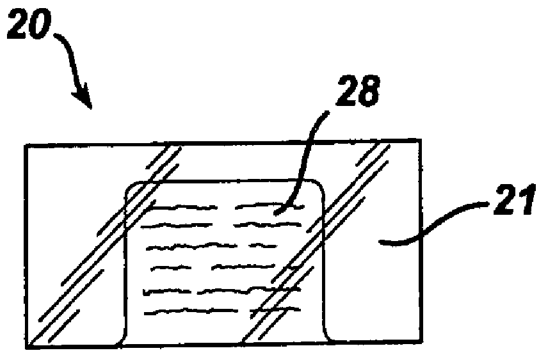
FIG. 4 shows a plan view of the inspection tag of FIG. 3 folded onto itself along the fold line.

The indicator 20, as shown in its activated form in FIG. 4, is attached to the inspected article or related documents by adhering the adhesive area 21 not covered by flap 26 to the article. One can then see through the flap 30 through window 26 the change in color from, for example, indicia 28 in FIG. 4 indicating non-void to a void indicia 22 in FIG. 5.

As shown in FIG. 3, the clear substrate 50 of the web becomes the viewing window 26 on the inspection sticker 20 and carries a sample of the substance that was collected from the inspected article as well as the organic compounds and constituents for facilitating the reagent reactions on the display face 53 and provides adhesive 51 for the attachment extensions 21 on the sides of the sticker.

Figure 5:
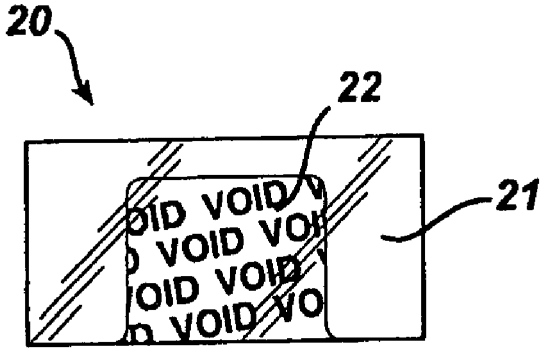
FIG. 5 shows a perspective view of the inspection tag of FIG. 4 a period of time after activation.

In the self-expiring inspection sticker shown in FIG. 4, the display face is printed with a hidden pattern of migrating ink 28 and background printing. With colored dyes mixed with dark pigments like carbon black, the mezzo-tint pattern or patterned array of the inks. No words or distinctive colors are shown to alert the inspection personnel. After a period of time, the dyes diffuse laterally into the white spaces of the display area so that color changes or words will appear. FIG. 5 shows the display area 22 with alert words the void indicia VOID in distinctive colors. This self-voiding property of these inspection stickers make them valuable for security of the inspection process.

Figure 6:
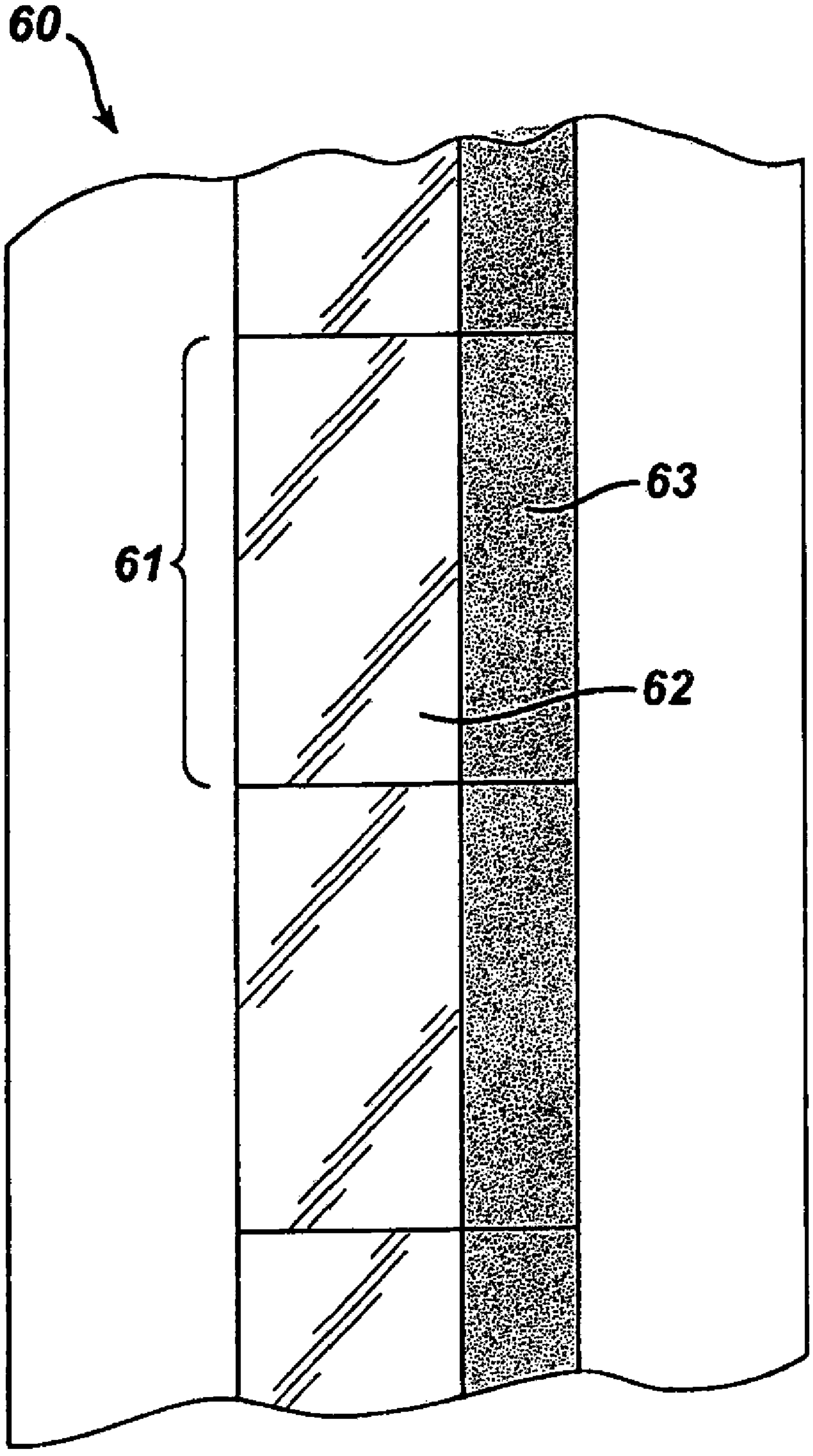
FIG. 6 shows a plan view of another embodiment of a plurality of inspection tags in sheet form.

FIG. 6 shows these inspection stickers die-cut in a different shape such as a rectangle. In this case, the web 60 is constructed exactly as shown in FIG. 1 with the display material 52 sandwiched between the adhesive face stock 51 and the silicone liner 54 (see FIG. 2). The display material 62 is laid along one edge of the rectangular web 60 and leaves a portion of the clear adhesive facestock 62 exposed.

Figure 7:
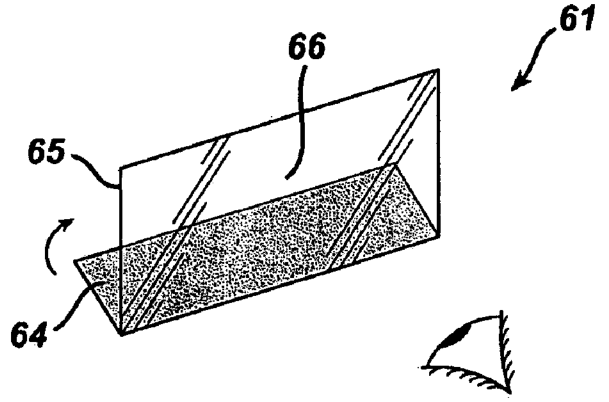
FIG. 7 shows a perspective view of a portion of an inspection tag of FIG. 6 partially folded onto itself along a fold line.

As shown in FIG. 7, the sampling for substances on articles is performed by touching the adhesive 64 to the surface of the article. The display area 64 is then folded over to initiate the color reactions or color timing sequence for time indicators.

Figure 8:
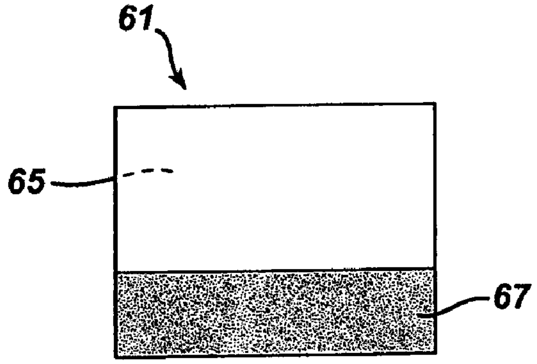
FIG. 8 shows a plan view of the inspection tag of FIG. 7 folded onto itself along the fold line.
Figure 9:
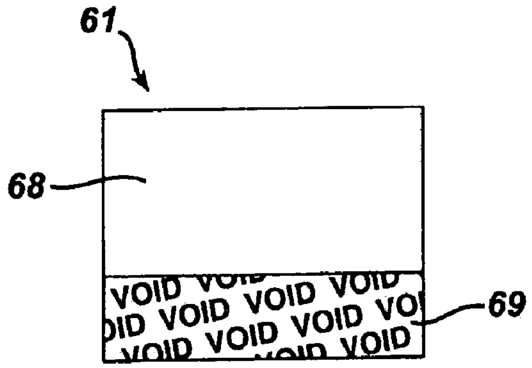
FIG. 9 shows a perspective view of the inspection tag of FIG. 8 a period of time after activation.

FIG. 8, shows the mezzo-tint pattern 67 while the exposed adhesive 65 is used to attach the sticker to the inspected article. After a period of time, as shown in FIG. 9, a VOID indicia 69 appears.

Figure 10:
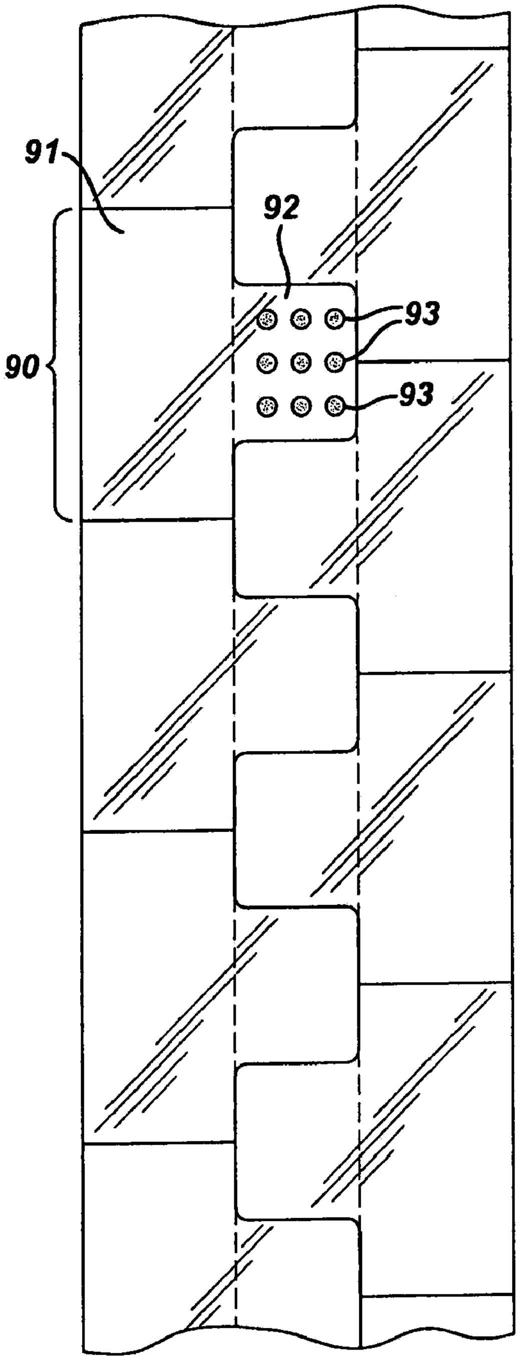
FIG. 10 shows a plan view of another embodiment of a plurality of inspection tags in sheet form.
Figure 11:
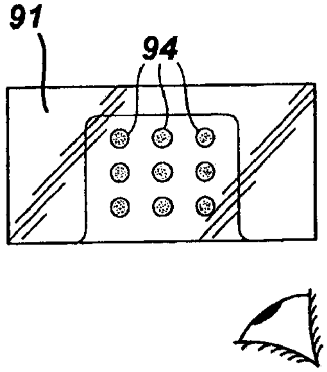
FIG. 11 shows a plan view of the inspection tag of FIG. 10 folded onto itself along the fold line.
Figure 12:
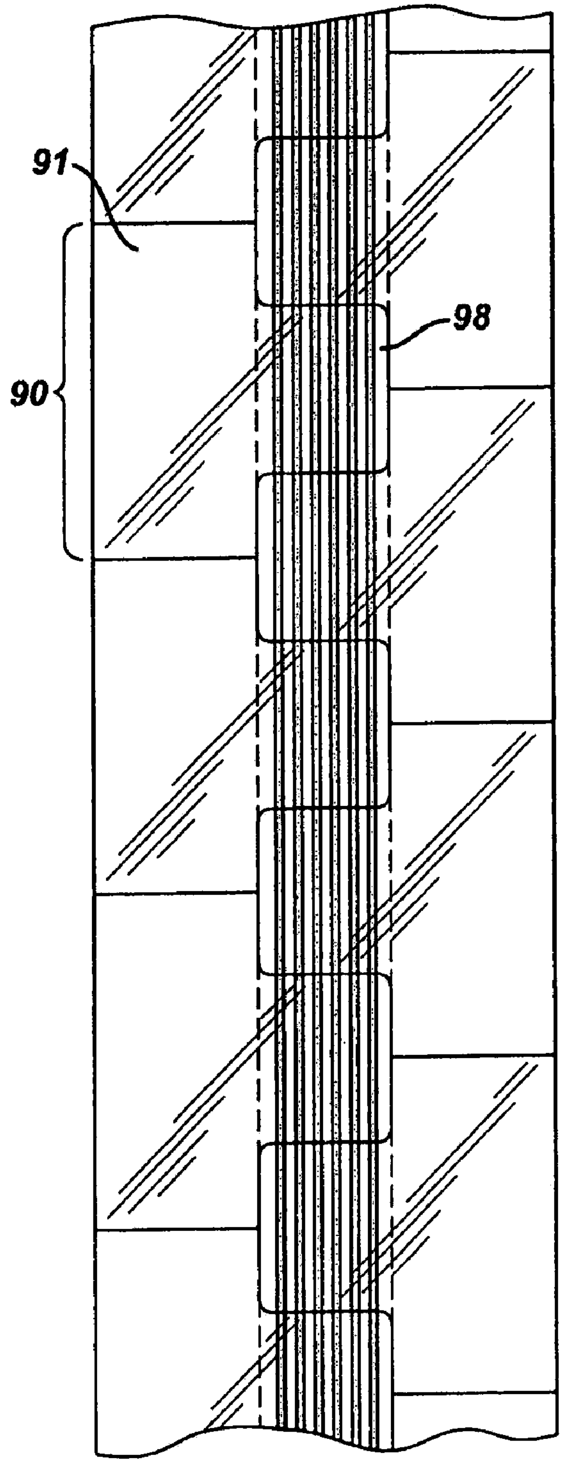
FIG. 12 shows a plan view of another embodiment of a plurality of inspection tags in sheet form.

Depending on the application, the color forming chemicals can be applied to the display surface in a variety of ways. They can be uniformly mixed into one coating or ink mixture and applied as a solid print onto the display surface. They can be printed as a pattern or text. As shown in FIG. 10, color forming reactants can also be applied in discrete areas so that each circle of reactant determines a specific substance or explosive. For example, the circles 93 on flap 92 could each contain reactants for different explosives and in this construction, the inspection tag would sample for 9 different explosives and show which type of explosive it is. When folded over, as shown in FIG. 11, the viewer looks at the array of circles 94 and their color change on the inspection tag, he would determine the type of explosive present by the position of the particular color circle. Likewise in FIG. 12, the color reactants have been applied as continuous bands along the display area. The relative position of the bands that change color would indicate the specific substance detected.

Figure 13:
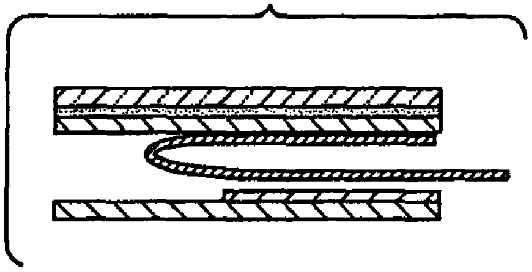
FIG. 13 shows a cross section of another embodiment of an inspection tag prior to activation.
Figure 14:
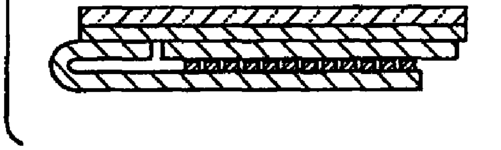
FIG. 14 shows a cross section of another embodiment of an inspection tag after activation.

Whereas we have shown inspection stickers which are a single unit and simply fold over for activation, it is possible to construct inspection stickers of several parts which perform the same function. A cross-sectional view of this type construction is shown in FIG. 13 where two materials have been attached together and the structure is activated in a similar manner of folding over a portion of the structure to bring the adhesive sampling area into contact with the color forming reactant display area.

It is also possible for construct these inspection stickers with more complicated separators. For example, in FIG. 13, 14, the separator between the adhesive sampling surface and the color forming reactants is in the form of a pull tab separator 98. The inspector exposes the adhesive surface by removing the separator 98, contacts the adhesive to sample the article surface for substances and then folds the adhesive back onto the color forming reactant display area.

While various changes may be made in the detailed construction and processes of this invention, it will be understood that such changes will be within the spirit and scope of the present invention. Having thus described the invention in detail, it is to be understood that the foregoing description is not intended to limit the spirit and scope thereof. What is desired to be protected by Letters Patent is set forth in the appended claims.

What is claimed is:

1. An indicator that detects the presence of a chemical residue comprising:
   - a substrate having an upper surface and a lower surface and a first portion and a second portion joined at a fold line, the first portion being smaller in area than the second portion;
   - an adhesive coating the upper surface of at least the second portion of the substrate and contactable with a surface to lift the chemical residue there from, a first reactant adhered to the upper surface of the first portion of the substrate;
   - whereby when the second portion is contacted with a surface containing the chemical residue, the residue adheres to the adhesive and when the first portion is subsequently folded along the fold line so that the upper surfaces of the substrate contact each other, a portion of the adhesive on the second portion remains exposed and the first reactant and chemical residue react with each other to provide the color indicia indicating the presence of the chemical residue.

2. The indicator of claim 1, wherein the substrate is transparent.

3. The indicator of claim 2, wherein the color indicia can be viewed through the lower surface of the substrate.

4. The indicator of claim 1, wherein an edge of the first portion extends from one end of the fold line to the other end of the fold line and the edge is adjacent to the portion of the adhesive on the second portion that remains exposed along an entire length of the edge.

5. The indicator of claim 4, wherein the edge defines an interface between the portion of the adhesive on the second portion that remains exposed and the lower surface of the first portion.

6. The indicator of claim 4, wherein the edge includes three sides and the portion of the adhesive on the second portion that remains exposed is adjacent each of the three sides.

7. The indicator of claim 1, wherein the adhesive is a pressure sensitive adhesive.

8. The indicator of claim 1, wherein the first reactant is configured to react with the chemical residue selected from the group consisting of explosives, drugs, and poisons.

9. The indicator of claim 1, wherein the first reactant is a uniform coating that substantially coats the upper surface of the first portion.

10. The indicator of claim 1, wherein the first reactant is disposed as a pattern.

11. The indicator of claim 10, wherein the pattern includes a plurality of discrete circles.

12. The indicator of claim 10, wherein the pattern includes a plurality of discrete bands.

13. The indicator of claim 1, wherein the indicator includes a plurality of reactants configured to detect different chemical residues in which the plurality of reactants are disposed in a plurality of spatially discrete areas such that, when a chemical residue reacts with one of the plurality of reactants to provide an indication, a type of chemical residue is identified by a spatial position of the indication.

14. The indicator of claim 1, wherein the indicator is a single piece tag.

15. The indicator of claim 1, wherein the indicator is configured for attachment to a separate item via the adhesive on the second portion that remains exposed.

16. The indicator of claim 1, wherein the substrate is formed to have a T-shape in which a first segment of the T-shape is the first portion and a second segment of the T-shape is the second portion.

* * * * *